Patented Nov. 24, 1931

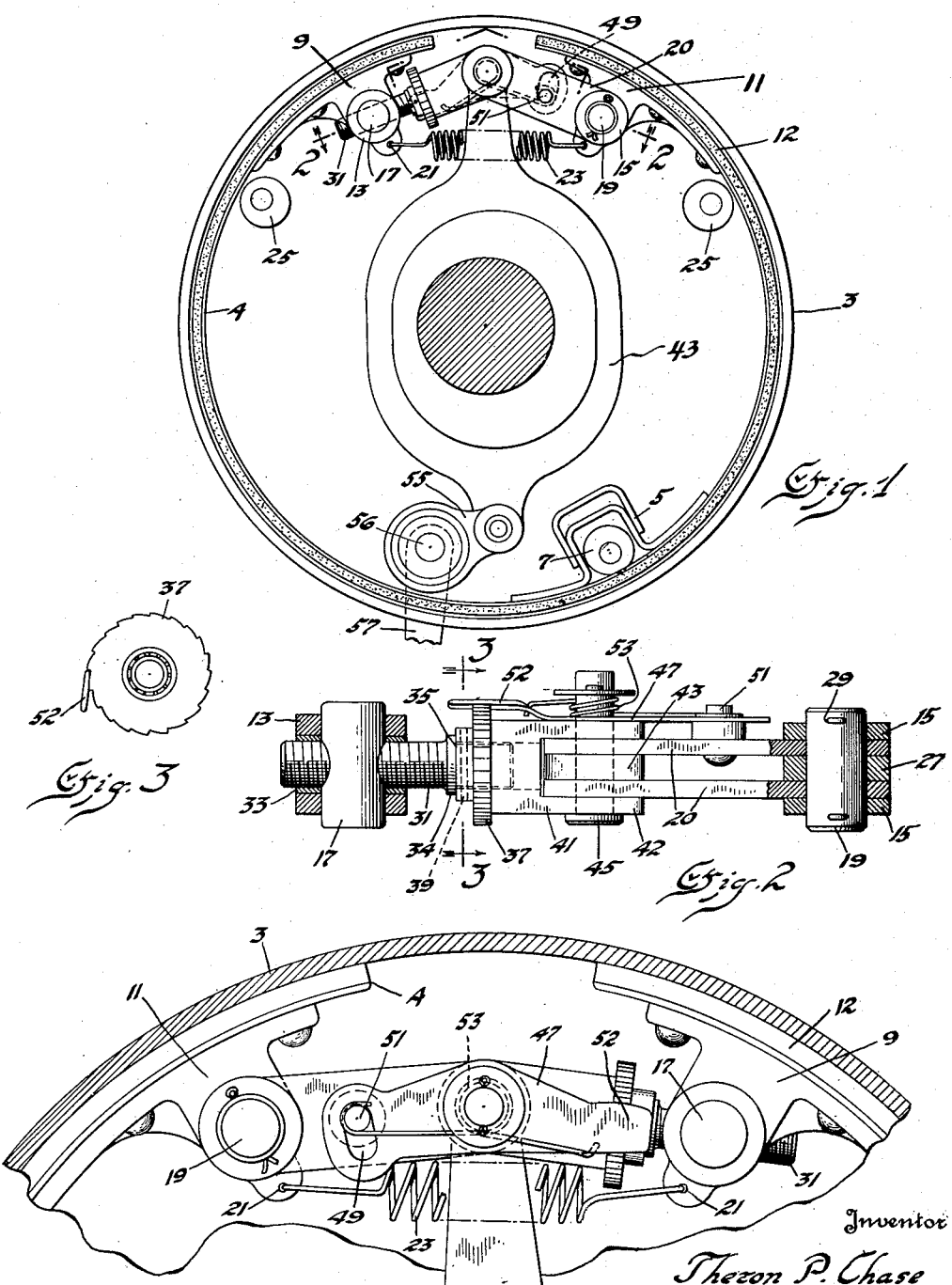

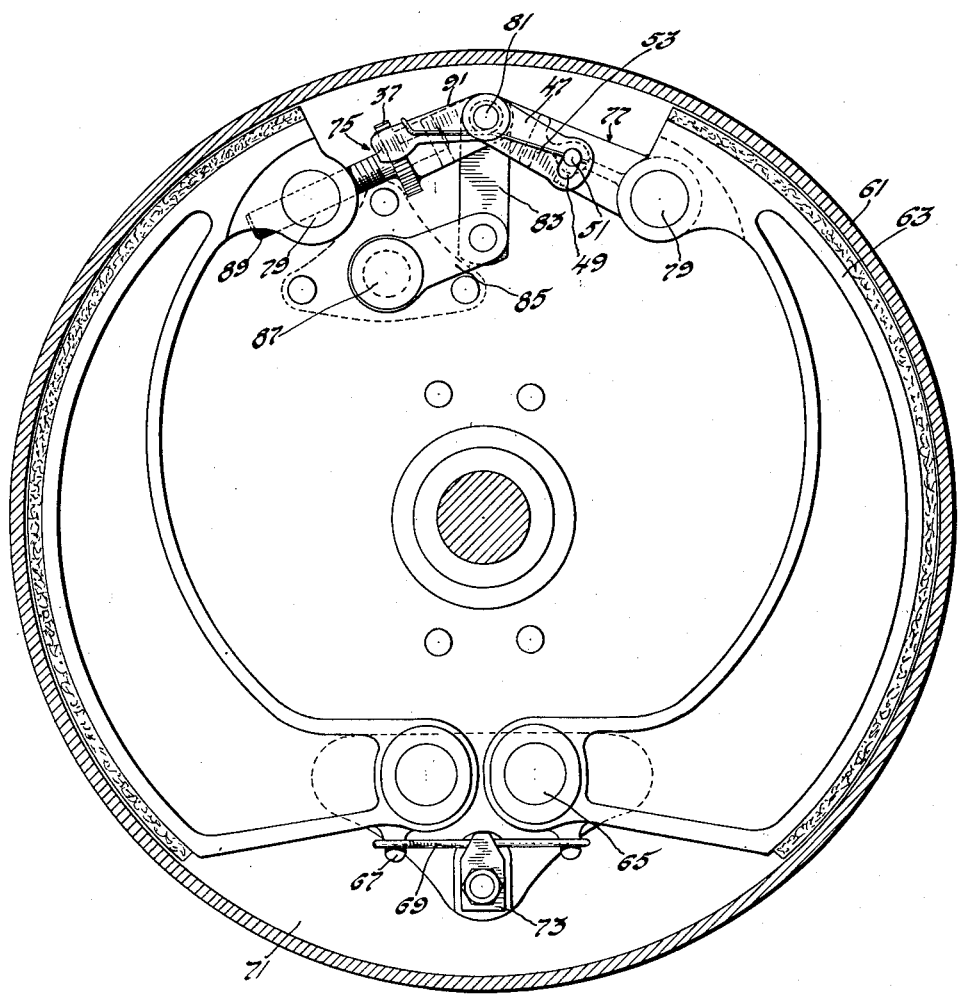

1,833,412

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

AUTOMATIC TAKE-UP FOR BRAKES

Application filed August 26, 1926. Serial No. 131,674.

This invention relates to brakes and more particularly to the provision of means to render such brakes self adjusting.

As the lining of brake bands becomes worn a greater pedal movement is required to efficiently apply the band to the drum. The wear may be so great that the pedal movement provided is not sufficient for properly applying the band to the drum. It is customary to make use of adjusting means to compensate for this wear in the bands.

It is the object of the present invention to provide adjusting means automatically acting upon the actuation of the brake applying means.

Other objects will appear from reading the following description.

In the drawings:

Figure 1 is a view in elevation of the brake mechanism with my adjusting means associated therewith.

Figure 2 is a section on line 2—2 of Figure 1.

Figure 3 is an elevation of the ratchet seen from line 3—3 of Figure 2.

Figure 4 is a section through the drum, the operating mechanism being seen from the side opposite that shown by Figure 1.

Figure 5 is a view in elevation of a modified form.

Referring by reference characters to the drawing, numeral 3 represents the drum and numeral 4 the band engaging the drum. The band carries a U-shaped bracket member 5 surrounding an eccentric 7 which may be secured to the face plate of the brake drum. The parts 5 and 7 constitute an anchoring means for the brake band. The adjacent ends of the band are provided with bracket members 9 and 11 secured to the band by rivets or other convenient means. The band is shown as provided with the usual lining 12. Bracket 9 is provided with lugs 13 and bracket 11 has lugs 15. Through openings in the lugs are pins 17 and 19. Beneath the pins 17 and 19 the lugs are apertured as at 21 to receive the ends of the coil spring 23. The spring 23 acts to withdraw the band from the drum and into engagement with adjustable eccentrics 25, the rotation of which determines the maximum spacing of the band from the drum.

Mounted on the pin 19 are a pair of links 20, one adjacent each lug 15. Spacer 27 and cotter pins 29 complete the brake connection at pin 19. Pin 17 is apertured to receive in threaded engagement therewith a threaded rod 31, there being a washer 33 surrounding pin 17 between each lug 13 and the threaded rod 31 apertured to receive the bolt 17. Rod 31 has a shoulder 34 at an intermediate point, adjacent which shoulder is the hub portion 35 of a ratchet wheel 37, a pin 39 being used to secure this ratchet to the rod. The end of rod 31 is rotatable on its longitudinal axis in an opening in a forked member 41. The ends of parallel links 20, the forks 42 of the member 41 and the end of a link 43 are rotatably mounted on the pin 45. Also on pin 45 is a lever 47. One end of the lever has a slot 49 through which passes a pin 51 projecting from one of the parallel links 20. The other end of the lever is formed as a pawl 52 engaging the ratchet wheel. A spring 53 surrounding the pin 45 is anchored on pin 51 and bears at its other end on the lever, holding the pawl against the teeth of ratchet 37.

The link 43 is moved to straighten the toggle and apply the brakes by means of an arm 55 secured to a rock shaft 56 mounted preferably in the cover of the drum. From this rock shaft projects an arm 57 which is swung about its pivot by any convenient brake operating connection.

Briefly described, the operation is as follows: In the releasing position of the brake, the spring 23 is holding the band off the drum, the limit of the operating movement being determined by the position of the eccentrics 25. Spring 53 is holding the lever 47 so that its pawl engages one of the teeth of the ratchet 37. When link 43 is pulled downwardly by the brake operating parts linkage 20 and link 31—41 act as a toggle to spread the ends of the band against the drum, acting against the tension of spring 23, the angle between the toggle links increasing. During this movement of the toggle the lever 47 first moves together with link 31—41 and pin 51 moves upwardly in the slot from the position shown in Figure 1. After the pin reaches the upper end of the slot lever 47 becomes locked for movement with linkage 20 and its pawl therefore moves along the periphery of the ratchet 37. If the movement be sufficiently large the pawl 52 will engage the next tooth of the ratchet 37. When the operating link is released spring 23 will return the band to released position, the pin 51 will first move to the lower end of the slot and will then swing the lever 47 and, since the pawl has been advanced one tooth the lever will turn the ratchet and the rod 31, which results in increasing the distance between the ends of the band. The slack in the band is thus taken up as the band assumes its released position. Should the clearance between band and the drum be considerable the take-up operation will be repeated with each successive operation of the brake until a pre-determined clearance is obtained. Since the ratchet is fastened to the rod, which latter is in threaded engagement with the pin carried by the end of the brake band, each time the ratchet is turned in a direction to unscrew the threaded connection the distance between the brake band ends is increased and the clearance decreased.

It will be seen that the length of the slot and the spacing of the teeth determine the clearance of the band since the end of the slot must be engaged by the pin and the lever turned sufficiently to cause its pawl to engage an adjacent tooth in order that the rod may be turned and the clearance reduced. Otherwise, when the operating means is released the pawl merely travels back along the teeth and the pin merely moves back in the slot of the lever.

It will be understood that the lever may be otherwise mounted, provided it similarly functions.

In Figure 5 is shown the adjusting device of my invention applied to a rigid shoe type of brake. This form of the invention is not different in any essential respect from that already described for use in connection with the band brake. Within the drum 61 are two rigid shoes 63 anchored on pivots 65. The shoes may be held on their anchoring pins by lugs 67 engaged by fastening means 69, the latter being fixedly secured to face plate 71 by a suitable clamp 73. The adjacent ends of the shoes are connected by a toggle composed of links 75 and 77, pins 79 being employed to make the connections. At 81 is a pin uniting the adjacent ends of the toggle links. Also carried on this pin is the end of a link 83 connected to an arm 85 mounted on an operating shaft 87. Outside the face plate, any desired operating means may be used to actuate the rock shaft 87 from the brake linkage. One of the toggle links, 75, is composed of two parts 89 and 91 having a relative rotation one in respect to the other, part 89 having threaded engagement with its shoe just as in the case of the parts 31 and 41 in the form first described. The ratchet 37, lever 47, pin 51, slot 49, and spring 53 involve no differences in construction or operation from the corresponding parts shown in Figure 1.

I claim:

1. In a brake, a drum, a friction member to engage said drum, a toggle connecting the ends of the member, actuating means for the toggle, one toggle link including parts having a relative axial rotation, one of said parts having adjustable connection with the end of the member, mechanism moved by the actuating means to effect the relative movement of said parts and an adjustment at the member connection to reduce clearance.

2. In a brake, a drum, a friction member to engage said drum, a pair of links each having a connection with an end of said member, common pivotal connection for said links, means for actuating said links, one of said links having an adjustable connection to take up slack in the brake, means carried by the common pivot and movable upon the actuation of the brake to effect an adjustment.

3. In a brake, a drum, a friction member to engage said drum, means to apply said member to the drum including a member having a threaded engagement with one end of said friction member, the threaded member having a ratchet rigid therewith, a pawl engaging the ratchet and automatically operated by the brake applying means.

4. In a brake, a drum, a friction member to engage said drum, a toggle connecting the adjacent ends of the member, one link of the toggle having parts relatively rotatable on a longitudinal axis, one of said parts having a threaded engagement with the member, a ratchet on said threaded member, a pawl mounted on the toggle to automatically engage said ratchet and to rotate said threaded member.

5. In a brake, a drum, a friction member to engage said drum, a toggle connecting the adjacent ends of the member, operating means for straightening the toggle, means to automatically take up the member including an adjustable connecting means between one toggle link and the end of the member, a ratchet to effect by its rotation said adjustment, a lever on said toggle with a pawl engaging said ratchet, a pin and slot connection between said lever and the second toggle link.

6. In a brake, a drum, a friction member to engage said drum, a toggle connecting the adjacent ends of the member, operating means for straightening the toggle, one link of the toggle having a part in threaded engagement with the member and provided with a ratchet, a lever mounted on the toggle, one end of the lever having a pawl engaging the ratchet, the other end of the lever having a slot, a pin on the second toggle link movable in said slot and swinging said lever upon abnormal movements to move said pawl relative to the ratchet, whereby an adjustment of the threaded connection is made upon the release of the brake actuating means.

7. In a brake, a drum, a friction member to engage said drum, a toggle for applying said member to the drum, one link of the toggle having an adjustable connection with the member, means associated with the toggle and actuated by the second link upon the release of the brake to effect the adjustment.

8. A brake comprising in combination, friction means, an applying device, a thrust member carried by the friction means and acted on by the applying device to apply the brake, and an automatically-operated worm for shifting the thrust member to compensate for wear of the friction means.

9. A brake comprising, in combination, friction means, an applying device, a thrust member carried by the friction means and acted on by the applying device to apply the brake, a worm for shifting the thrust member to compensate for wear of the friction means, and ratchet means for operating the worm.

In testimony whereof I affix my signature.

THERON P. CHASE.